United States Patent [19]

McCreery

[11] 3,780,408
[45] Dec. 25, 1973

[54] CUTTING TOOL
[75] Inventor: James F. McCreery, Latrobe, Pa.
[73] Assignee: Kennametal Inc., Latrobe, Pa.
[22] Filed: Mar. 2, 1972
[21] Appl. No.: 231,199

[52] U.S. Cl. .................................................. 29/96
[51] Int. Cl............................................. B26d 1/00
[58] Field of Search ........................................ 29/96

[56] References Cited
UNITED STATES PATENTS

| | | | |
|---|---|---|---|
| 3,662,445 | 5/1972 | Whitaker | 29/96 X |
| 2,737,705 | 3/1956 | Novkov | 29/96 |
| 3,688,366 | 9/1972 | Jones | 29/96 |
| 3,238,607 | 3/1966 | Wallbom | 29/96 |

FOREIGN PATENTS OR APPLICATIONS

| 568,876 | 4/1945 | Great Britain | 29/96 |
|---|---|---|---|

*Primary Examiner*—Leonidas Vlachos
*Attorney*—Melvin A. Crosby

[57] ABSTRACT

A cutting tool in which a small rod-like piece of cemented carbide material is mounted at an angle so that one end projects from the holder and on which one end is a cutting edge for being presented to work to be turned. The holder consists of a block adapted for mounting in a holder in a machine tool and on one side of the block is a support plate having an inclined insert supporting surface at one end on which the rod-like cutting insert rests. A clamp plate overlies the support plate and a clamp presses the clamp plate down so that a surface thereon engaging the insert from above will clamp the insert against the support plate. The insert in the lateral direction has a greater dimension than the corresponding dimension of the support and clamp plates and thereby takes a kerf from the work which has clearance on both sides from the support and clamp plates whereby the tool is useful, amongst other things, for cut off operations.

9 Claims, 19 Drawing Figures

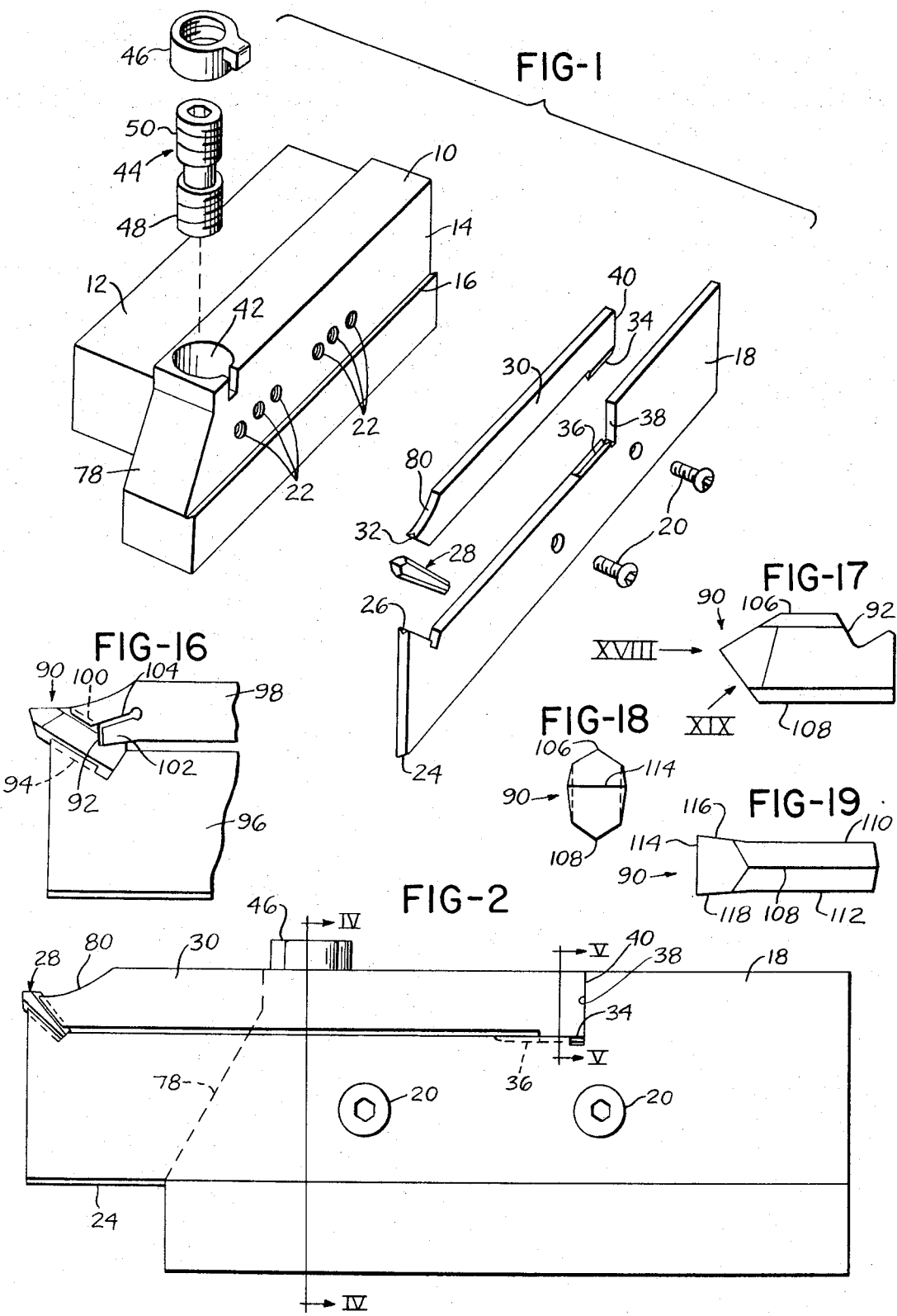

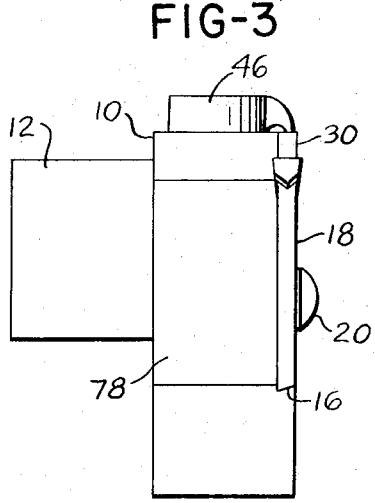
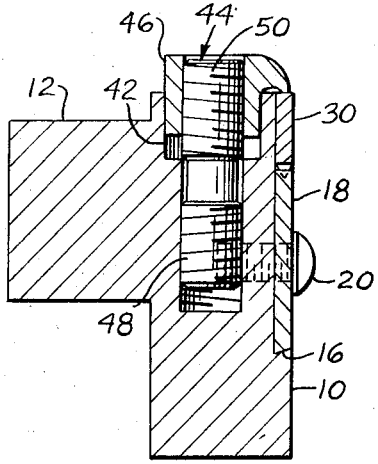
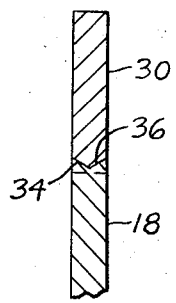
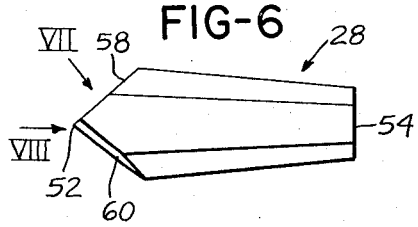
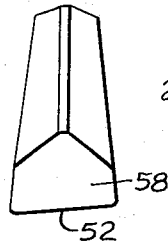
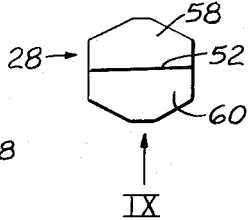
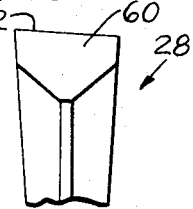
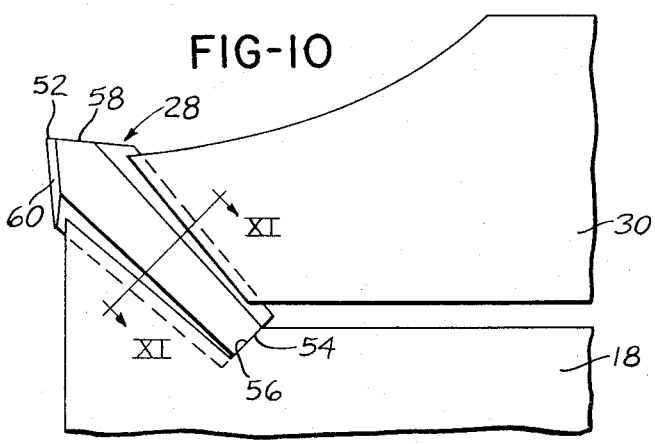
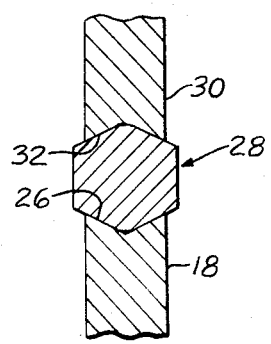
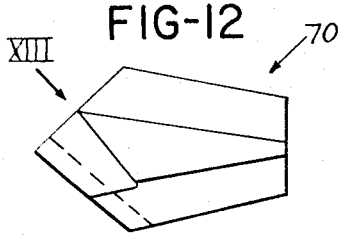
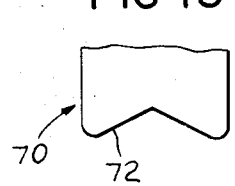
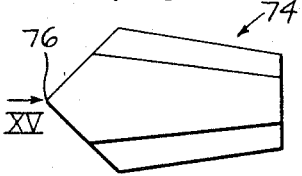
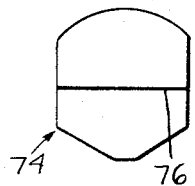

CUTTING TOOL

The present invention relates to cutting tools and is particularly concerned with a novel cutting insert formation and a holder therefor.

A large class of cutting tools consist of the combination of a holder adapted to be clamped in the tool supporting member of a machine tool. The holder includes some arrangement for clamping a replaceable insert thereon. The inserts, quite often, are of the throw away type, so that when the cutting edge or edges of the insert become worn, the insert can be discarded and a new one placed in the holder.

The inserts are quite often made of a cemented carbide material, such as cemented tungsten carbide, or mixtures thereof, with other carbides and are quite expensive, as well as being somewhat brittle. The usual cutting insert is quite often a polygonal member having parallel top and bottom faces and cutting edge regions formed about the periphery of at least one of said faces so that the insert is indexable on the holder to present the cutting edges one after the other to the work.

When cutting edges are formed about the peripheries of both of the top and bottom walls, the insert becomes not only indexable, but also invertable. In any case, the insert usually contains a considerable amount of cemented carbide material than is employed in the actual cutting operations carried out by the cutting tool.

A particular class of cutting operations in which difficulty is encountered in observing economy in the use of cemented carbide material is a cut off operation. In such operations, an insert which is relatively thin in the lateral direction is moved radially into a rotating work member and takes a kerf down to the axis of the member thereby performing a cut off operation.

Cut off operations are substantially nonproductive in respect of imparting any configuration to the work member and are thus carried out at the highest possible speed so that as little time is lost as possible in this operation.

Heretofore, cut off tools have been somwhat wasteful in the manner in which the cemented carbide cutting insert material was employed because inserts of substantial size, bar-like, for example, were employed for the cutting off operation with the inserts often being arranged to be turned from end to end by either the vertical or horizontal axis to present a second cutting edge to the work. Even in such cases, however, the amount of carbide material in the insert could be considered to be somewhat excessive for the work to be done.

Having the foregoing in mind, a primary objective of the present invention is the provision of a cutting insert of special configuration and a special holder therefor which permits the insert to be made to relatively small dimensions without in any way, however, impairing the efficiency of operation thereof.

Still another object of the present invention is the provision of a cutting insert and a tool holder therefor in which the insert is supported in the most favorable position for developing the ultimate resistance to breakage of the insert.

A still further object is the provision of an insert and a holder therefor for machining operations in which the insert is quite small and it can, therefore, be discarded with economy when it becomes dull.

These and other objects and advantages of the present invention will become more apparent upon reference to the following detailed specification taken in connection with the accompanying drawings in which:

FIG. 1 is an exploded perspective view showing an insert and holder therefor according to the present invention.

FIG. 2 is a side view of the insert and holder in assembled condition.

FIG. 3 is an end view looking in from the left side of FIG. 2.

FIG. 4 is a vertical transverse sectional view indicated by line IV—IV on FIG. 2 showing the construction of the clamp for clamping the insert in the holder.

FIG. 5 is a fragmentary vertical transverse sectional view indicated by line V—V on FIG. 2.

FIG. 6 is a side view of a typical insert according to the present invention drawn at enlarged scale.

FIG. 7 is a view looking in at one side of the insert as indicated by arrow VII on FIG. 6.

FIG. 8 is an end view of the insert looking in from the left of FIG. 6.

FIG. 9 is a view looking in at the side of the insert as indicated by arrow IX on FIG. 8.

FIG. 10 is a view showing the insert in clamped position in the holder and drawn at enlarged scale.

FIG. 11 is a sectional view indicated by line XI—XI on FIG. 10.

FIG. 12 is a side view of still another type insert.

FIG. 13 is a view looking in at the end of the insert of FIG. 12 as indicated by arrow XIII on FIG. 12.

FIG. 14 is a side view of still another insert according to the present invention.

FIG. 15 is an end view of the insert of FIG. 14 as indicated by arrow XV on FIG. 14.

FIG. 16. is a fragmentary view showing a modification of the tool holder and insert according to the present invention.

FIG. 17 is a side view of the insert of FIG. 16 drawn at enlarged scale.

FIG. 18 is a view looking in from the left end of FIG. 17 as indicated by arrow XVIII on FIG. 17.

FIG. 19 is a view looking in from the left side of FIG. 17 as indicated by arrow XIX on FIG. 17.

BRIEF SUMMARY OF THE INVENTION:

According to the present invention, a supporting tool block is provided having a flat area on one side against which a support plate is fixed, as by bolts, so as to have one end projecting outwardly from the block. The outwardly projecting end of the support plate has an inclined surface thereon adapted to receive a relatively small rod-like cutting insert having a cutting edge formed on the end which projects outwardly from the support plate.

Arranged in the same frame as the support plate is a clamp plate, also having an inclined surface at one end and adapted to engage the insert from above. A clamp member carried by the block engages the clamp plate and clamps it firmly against the insert thereby holding the insert in place on the tool block. The insert in the lateral direction, at least at the projecting outer end thereof, is wider than the support and clamp plates and will, thus, when fed into a workpiece in the radial direction, take a kerf which has clearance on each side from the support and clamp plates.

DETAILED DESCRIPTION OF THE INVENTION:

Referring to the drawings somewhat more in detail, in FIGS. 1 through 5, the cutting tool according to the present invention will be seen to comprise a relatively heavy block 10 which may have a bar-like wing 12 projecting from one side and by means of which the tool can be clamped in a tool post or the like. On the side of block 10 opposite wing-like projections 12, the block is formed with a planar surface 14 terminating at the bottom edge in an inclined ledge 16.

A support plate member 18 is adapted to be placed in face to face relation to surface 14 and secured thereto as by bolts 20 extending through the support plate and engaging a selected pair of threaded holes 22 formed in block 10. The lower edge of plate 18 is angled off as at 24 so that the support plate rests on ledge 16.

As will be seen in FIG. 2, support plate 18 extends outwardly beyond the end of block 10 a substantial distance, the particular degree of extension of the support plate being determined by the holes in which screws 20 are threaded.

The projecting end of support plate 20 is formed with an inclined support surface 26 on which is adapted to rest a relatively small rod-like cutting insert 28. Insert 28 is made of a hard wear resistant material such as cemented tungsten carbide or another cemented carbide composition or may be of any other suitable hard wear resistant material such as ceramic or a case carbide composition.

Positioned in the same plane as support plate 18 is a clamp plate 30 having an inclined surface 32 on one end thereof adapted to engage insert 28 from above. The opposite end of clamp plate 30 has a dependent beveled tongue 34 adapted to seat in a beveled notch 36 on support plate 18.

The relationship of support plate 18 and clamp plate 30 when in assembled relation will be seen in FIG. 2, wherein it will be noted that the major portion of the length of clamp plate 30 is spaced from the upper edge of support plate 18. It will also be noted that the support plate 18 has a shoulder or abutment surface 38 formed thereon which is engaged by the adjacent end 40 of clamp plate 30 thereby preventing shifting movement of the clamp plate on the support plate.

Adjacent the left end of block 10, the block is provided with a counterbored hole 42 adapted for receiving a screw 44 which carries a clamp member 46 adapted to engage the top of clamp plate 30, as will be seen in FIGS. 2, 3 and 4. Referring particularly to FIG. 4, hole 42 will be seen to be threaded near the bottom to receive the lower portion 48 of screw 44 with these threads preferably being right hand threads.

Near the top screw 44 has threads 50 threadedly engaging threads formed in clamp member 46, and these threads are advantageously left hand. The arrangement is such that the clamp member moves toward and away from clamp plate 30 rapidly when the screw is rotated, but the screw threads are, nevertheless, only single pitch, and are, therefore, self locking so that extremely secure clamping of plate 30 and, therefore, of insert 28, is secured.

As will be noted in FIG. 2, and more clearly in the enlarged scale view of FIG. 10, insert 28 is formed with a cutting edge 52 at one end and has a flat surface 54 at the other end perpendicular to the longitudinal axis of the cutting insert. Surface 54 abuts an abutment surface 56 formed on support plate 18 at one end of support surface 26 and extending substantially perpendicularly thereto.

Insert 28, it will be noted in FIG. 10, projects outwardly beyond the extreme end of support plate 18, so that the cutting edge can engage work to be turned by the insert. FIG. 10 will also show that the cutting edge 52 of the insert is formed by the juncture of two planes 58 and 60, each of which makes an angle of at least slightly less than 45 degrees with the longitudinal axis of the insert.

With the longitudinal axis of the insert disposed at 45 degrees to the length of the support plate, the described disposition of the planes which form the cutting edge provides for front clearance of the insert from the work being turned and a slight positive rake angle on the top of the insert. The rake angle can be made more positive or can even be at a zero angle or be negative, but it is important to maintain the front clearance as determined by plane 60 of FIG. 10.

The cutting edge 52 in FIG. 10 extends somewhat angularly with reference to a perpendicular to the plane of support plate 18 and clamp plate 30 as will best be seen in FIG. 7, but the cutting edge can take any desired configuration. The angle of inclination of the cutting edge of FIG. 7 is such that, when performing a cutting operation, a limited axial length of the workpiece will be cut through, whereby simplifying handling of the cut off workpiece.

FIG. 11 is a section through the insert and the support plate 18 and clamp plate 30 and will show that the insert is noncircular in cross section, and that the support surface 26 and clamp surface 32 are substantially complementary to the insert in configuration. The insert could, of course, be circular, but location of the cutting edge at the proper angle is greatly simplified by making the cutting insert noncircular in cross section at least on one side.

As illustrated, the insert is substantially hexagonal but, as mentioned, other shapes could be employed and the two sides of the insert, that is, the upper and lower sides, can be different in shape, thereby insuring that the insert will be mounted, not only in a position of proper orientation in respect of the axis thereof, but also with a predetermined side up and the other side down.

FIG. 11 also will show that the cutting insert is wider in a direction perpendicular to the plane of support plate 18 and clamp plate 30 than the plates and projects laterally in both directions from the plates so that a kerf taken by the cutting edge of the insert will have clearance on both sides from plates 18 and 30.

FIGS. 2 and 10 also show that the insert is preferably tapered toward the rear end thereof although the insert could be made of substantially uniform cross section from end to end. The advantage of tapering the insert is that clearance angles are thereby created rearwardly of the cutting edge 52, whereas if the insert were made to the same cross sectional dimensions from end to end, the clearance between the sides of the insert and the work would have to be formed on the insert by machining operations.

FIGS. 6 through 9 show details in connection with the configuration of the insert of FIG. 10 but, as mentioned, it will be understood that the cutting edge on the insert and the actual configuration of the insert is subject to modification.

FIGS. 12 and 13 show an insert 70 in which the cutting edge 72 is in the form of a rather wide angle "V" with rounded outer ends.

FIGS. 14 and 15 shown an insert 74 having a straight cutting edge 76 thereon and this insert conforms substantially in shape to the insert shown in FIGS. 1 and 2.

The block 10, it will be noted, especially in FIGS. 1 and 2, has the front wall thereof at 78 inclined backwardly thereby providing for the maximum distance between the cutting edge of the insert and the front side of the block for taking deep cuts, while at the same time extending the support for support plate 18 as far out as possible. It will also be noted that the end of clamp plate 30 adjacent the inclined surface which engages the insert is relieved as at 80 to provide a path along which chips can flow which are taken by the insert.

FIGS. 16 through 19 show a modification in which the insert 90 is provided with a notch 92 formed in the side thereof that is uppermost when the insert rests on the supporting surface provided therefor on the support plate.

In FIG. 16, the insert 90 rests on support plate 94 provided on the end of support plate 96 and is clamped against the support surface by clamp plate 98 which has on the extreme end a surface 100 for engaging the insert from above and a finger 102 adapted to enter and engage the upwardly facing surface of notch 92.

Advantageously, the clamp plate 98 is provided with a generally longitudinally extending incision 104 separating finger 102 from that portion of the clamp plate carrying surface 100, so that even after finger 102 engages the upwardly facing surface of notch 92, some further downward movement of clamp plate 98 is possible in order to effect secure clamping of the insert between surfaces 94 and 100.

FIGS. 17 to 19 will also show that the inserts 90 could be provided with substantially parallel top and bottom edges 106 and 108 and substantially parallel side surfaces 110 and 112. The cutting edge 114 on the outer end of the insert is made wider in the lateral direction of the insert than the spacing between the sides 110 and 112 of the insert by causing the insert to taper outwardly as at 116 and 118.

Any of the inserts described and illustrated can be formed by molding techniques so that substantially no work operations on the inserts are necessary after they have been removed from the mold and, in the case of cemented carbides, sintered. The inserts may be honed, if so desired, but in most cases, no other machining operations thereon are required.

In the modification which will be seen in FIGS. 2, the longitudinal axis of the insert is inclined at an angle of about 45 degrees to the horizontal, whereas in the modification shown in FIG. 16, the longitudinal axis of the insert makes an included angle of about 30 degrees with the horizontal, and the two planes on the projecting end of the insert which intersect to form the cutting edge of the insert are inclined in conformity with the angle of the longitudinal axis of the insert.

Thus, the outwardly facing surface on the end of the insert will be inclined so as to make an angle of from, say, 5 to 7 degrees with the vertical, thereby to provide front clearance for the insert during a cutting operation, whereas the upwardly facing surface on the outer end of the insert could vary a few degrees one way or the other from a horizontal thereby to provide for the desired rake conditions at the cutting edge.

The modification of FIG. 16, however, similarly to that of FIG. 2, utilizes a small piece of carbide from which the making of the cutting insert and which is disposed on the holder at such an angle as to take full advantage of the strength of the material of the insert and to establish the most favorable clamping conditions for the insert.

What is claimed is:

1. In a cutting tool; a rod-like insert having a wedge shape formed on one end defining a lateral cutting edge, an elongated support member thin relative to the length thereof and having a support surface at one end inclined at an angle on the order of about 30° to 45° to the direction of the length of said support member and adapted to engage said insert from beneath with the longitudinal axis of the insert substantially parallel to said surface, a surface at the inner end of said support surface perpendicular thereto abuttingly engaging the other end of the insert, an elongated clamp member also thin relative to the length thereof substantially coplanar with and parallel to said support member and having a clamping surface at one end generally parallel to said support surface and engaging the insert from above, said clamp member having a first abutment surface at the other end thereof, said support member being formed with a notch to receive said clamp member and having said support surface at one end and a second abutment surface at the other end engaging the said clamp member abutment surface, said notch having an upwardly facing bottom wall, said clamp member and support member having interengaging means adjacent said abutment surfaces which support the adjacent end of said clamp member while the other end of said clamp member engages the insert and the intermediate portion of said clamp member is spaced from said bottom wall of said notch, said one end of the insert protruding outwardly beyond the said one end of said support member and clamp member, and clamp means engaging said clamp member on the side facing away from the insert and between the ends thereof for urging said clamp member toward said support member to clamp the insert between said clamp and support surfaces.

2. A cutting tool according to claim 1 in which at least the said protruding one end of said insert projects laterally beyond the lateral limits of said support member and clamp member at both sides.

3. A cutting tool according to claim 2 in which said cutting edge extends laterally on said one end of said insert.

4. A cutting tool according to claim 1 which includes a tool block, means fixedly connecting said support member to one side of said tool block with the said one end of said support member projecting outwardly from one end of said tool block, said clamp means comprising a clamp element adjustably carried by said block and engaging said clamp member on the side thereof opposite said support member.

5. A cutting tool according to claim 4 in which said one side of said block has a ledge formed thereon facing said support member and supportingly engaging the adjacent edge of said support member.

6. A cutting tool according to claim 1 in which at least one of said support and clamp surfaces is in the form of a portion of a polygon when viewed in cross section and said insert in cross section has on at least one side a contour complementary to the said one surface.

7. A cutting tool according to claim 1 in which said insert tapers inwardly in a direction away from said one end thereof and said support and clamp surfaces are inclined to conform to the taper of said insert.

8. A cutting tool according to claim 1 in which said insert has a lateral notch therein near the inner end on the side facing said clamp member and said clamp member has a portion at the end nearest said insert engaging said notch.

9. A cutting tool according to claim 1 in which said cutting edge is formed at the intersection of two planar surfaces on said one end of said insert with the plane of each surface perpendicular to the plane of said support and clamp members and each making an angle of less than 45° with the longitudinal axis of said insert.

* * * * *